United States Patent
Wippler (10) Patent No.: US 9,800,079 B2
(45) Date of Patent: Oct. 24, 2017

(54) VEHICLES AND VEHICLE SYSTEMS FOR WIRELESSLY CHARGING PORTABLE ELECTRONIC DEVICES

(71) Applicant: Toyota Motor Engineering & Manufacturing North America, Inc., Erlanger, KY (US)

(72) Inventor: Erik Anthony Wippler, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 288 days.

(21) Appl. No.: 14/298,393

(22) Filed: Jun. 6, 2014

(65) Prior Publication Data
US 2015/0357860 A1    Dec. 10, 2015

(51) Int. Cl.
*H02J 7/00* (2006.01)
*H02J 7/02* (2016.01)
*B60L 11/18* (2006.01)
*H02J 50/10* (2016.01)

(52) U.S. Cl.
CPC .............. *H02J 7/025* (2013.01); *B60L 11/18* (2013.01); *H02J 7/0047* (2013.01); *H02J 50/10* (2016.02); *H02J 2007/0049* (2013.01)

(58) Field of Classification Search
CPC .......... H02J 7/025; H02J 50/10; H02J 7/0047; H02J 2007/0049; B60L 11/18
See application file for complete search history.

(56) References Cited

U.S. PATENT DOCUMENTS 5,563,491 A * 10/1996 Tseng ................. B60L 11/1816
                                                            194/904
5,635,813 A *  6/1997 Shiga ................. G01R 31/3648
                                                            320/106
6,731,925 B2 *  5/2004 Naboulsi ................ B60R 11/02
                                                            340/575

(Continued)

FOREIGN PATENT DOCUMENTS

EP      2712152      3/2014
WO      2011116394   9/2011

OTHER PUBLICATIONS

Howard, B.; "Chrysler First to Offer Wireless In-Car Phone Charging in Dodge Dart"; ExtremeTech; http://www.extremetech.com/extreme/125743-chrysler-first-to-offer-wireless-in-car-phone-charging-in-dodge-dart.

(Continued)

Primary Examiner — Naum B Levin
(74) Attorney, Agent, or Firm — Dinsmore & Shohl LLP (57) ABSTRACT

Vehicles and vehicle systems for wirelessly charging portable electronic devices are disclosed. A vehicle includes one or more processors, one or more memory modules, a display, a wireless charger module, and machine readable instructions stored in the one or more memory modules. When executed by the one or more processors, the machine readable instructions cause the vehicle to present a wireless charger module input control on the display, detect tactile input indicative of a selection of the wireless charger module input control, and control the wireless charger module, in response to detecting the tactile input, thereby wirelessly charging the portable electronic device.

19 Claims, 5 Drawing Sheets

(56) References Cited

U.S. PATENT DOCUMENTS

| | | | | |
|---|---|---|---|---|
| 7,116,941 B1* | 10/2006 | Tabe | H04B 1/082 | 455/344 |
| 7,304,454 B2* | 12/2007 | Inui | H02J 7/0075 | 320/149 |
| 7,528,579 B2* | 5/2009 | Pacholok | H02J 7/022 | 320/130 |
| 7,772,802 B2* | 8/2010 | Manico | H02J 7/025 | 320/106 |
| 7,933,695 B2* | 4/2011 | Yamaguchi | B60K 6/365 | 180/65.29 |
| 8,310,200 B2 | 11/2012 | Matouka et al. | | |
| 8,384,342 B2* | 2/2013 | Hasegawa | H01M 8/04037 | 320/101 |
| 8,629,654 B2 | 1/2014 | Partovi et al. | | |
| 8,768,286 B2* | 7/2014 | Naboulsi | A61B 5/18 | 340/575 |
| 8,796,999 B2* | 8/2014 | Toncich | H02J 7/025 | 320/108 |
| 8,847,731 B2* | 9/2014 | Tieman | B60R 25/24 | 340/425.5 |
| 8,860,250 B2* | 10/2014 | Salcone | H02J 7/0047 | 307/65 |
| 8,862,910 B2* | 10/2014 | Sato | H04M 1/72522 | 713/300 |
| 8,954,223 B2* | 2/2015 | Hoshihara | B60L 11/1838 | 701/32.3 |
| 9,045,042 B2* | 6/2015 | Kusumi | B60L 1/003 | |
| 9,048,665 B2* | 6/2015 | Wojcik | H05K 5/0086 | |
| 9,131,335 B2* | 9/2015 | Huttunen | H04B 7/26 | |
| 9,164,656 B1* | 10/2015 | Keller | G05B 19/41865 | |
| 9,178,369 B2* | 11/2015 | Partovi | H02J 7/025 | |
| 9,252,606 B1* | 2/2016 | Aronov | H02J 7/0045 | |
| 9,270,134 B2* | 2/2016 | Gaddam | H02J 7/007 | |
| 9,413,182 B2* | 8/2016 | Park | H02J 7/0054 | |
| 2005/0277438 A1* | 12/2005 | Tilk | B60R 25/2063 | 455/556.1 |
| 2007/0208468 A1* | 9/2007 | Sankaran | B60K 6/445 | 701/31.4 |
| 2009/0079263 A1* | 3/2009 | Crumm | H02J 1/14 | 307/43 |
| 2010/0198428 A1* | 8/2010 | Sultan | G07C 9/00309 | 701/2 |
| 2010/0228405 A1* | 9/2010 | Morgal | B62H 3/02 | 701/2 |
| 2010/0323657 A1* | 12/2010 | Barnard | H04W 4/02 | 455/404.1 |
| 2011/0169447 A1* | 7/2011 | Brown | B60L 3/0069 | 320/109 |
| 2011/0252247 A1* | 10/2011 | Yokoyama | H02J 7/34 | 713/300 |
| 2011/0257817 A1* | 10/2011 | Tieman | B60R 25/24 | 701/2 |
| 2012/0091951 A1* | 4/2012 | Sohn | H02J 7/0047 | 320/108 |
| 2012/0161692 A1* | 6/2012 | Kobayashi | B60L 11/1862 | 320/101 |
| 2012/0206098 A1 | 8/2012 | Kim | | |
| 2012/0283894 A1* | 11/2012 | Naboulsi | A61B 5/18 | 701/1 |
| 2013/0010018 A1* | 1/2013 | Economy | H05B 37/0272 | 345/691 |
| 2013/0029595 A1 | 1/2013 | Widmer et al. | | |
| 2013/0054758 A1* | 2/2013 | Imes | H04L 12/2827 | 709/219 |
| 2013/0082662 A1* | 4/2013 | Carre | H02J 7/0052 | 320/134 |
| 2013/0088198 A1* | 4/2013 | Masuda | H02J 7/044 | 320/109 |
| 2013/0099776 A1 | 4/2013 | Wu et al. | | |
| 2013/0221928 A1* | 8/2013 | Kelty | B60L 11/187 | 320/134 |
| 2013/0234660 A1* | 9/2013 | Moriguchi | H02J 7/025 | 320/108 |
| 2013/0339720 A1* | 12/2013 | Levy | G08G 1/147 | 713/100 |
| 2014/0049221 A1* | 2/2014 | Nishide | B60R 16/00 | 320/115 |
| 2014/0070932 A1 | 3/2014 | Prasad et al. | | |
| 2014/0167438 A1* | 6/2014 | Lambert | B60R 16/02 | 296/24.34 |
| 2015/0137739 A1* | 5/2015 | Shizuno | H01M 10/441 | 320/107 |
| 2015/0215392 A1* | 7/2015 | Miebs | H04L 41/0806 | 709/201 |
| 2015/0217777 A1* | 8/2015 | Konigsberg | B60W 50/08 | 701/36 |
| 2015/0227445 A1* | 8/2015 | Arscott | G06F 11/3062 | 713/340 |
| 2015/0357860 A1* | 12/2015 | Wippler | H02J 7/025 | 320/108 |
| 2015/0360577 A1* | 12/2015 | Greenwood | H02J 7/025 | 320/108 |

OTHER PUBLICATIONS

Woodyard, C.; "Toyota Puts Wireless Phone Charging in Avalons"; USA Today; http://www.usatoday.com/story/money/cars/2012/12/19/inductive-charging-toyota/1779941/.

\* cited by examiner

VEHICLES AND VEHICLE SYSTEMS FOR WIRELESSLY CHARGING PORTABLE ELECTRONIC DEVICES

TECHNICAL FIELD

The present specification generally relates to wireless charging of portable electronic devices and, more specifically, to vehicles and vehicle systems for wirelessly charging portable electronic devices.

BACKGROUND

Portable electronic devices, such as cell phones, may be wirelessly charged when disposed within a vehicle. Wireless charger modules used to charge portable electronic devices in vehicles generally include separate mechanical power switches and provide feedback that the wireless charger module is on via an indicator lamp. Such mechanical power switches and indicator lamps may be in close proximity to the wireless charger module, which may disposed within a charger bin. Control of such wireless charger modules (e.g., turning the wireless charger module on or off) may be difficult when the charger bin door is closed. Furthermore, the display of information pertaining to wireless charging may be hidden from the user when the charger bin door is closed.

Accordingly, a need exists for alternative vehicles and vehicle systems for wirelessly charging portable electronic devices.

SUMMARY

In one embodiment, a vehicle for wirelessly charging a portable electronic device includes one or more processors, one or more memory modules, a display, a wireless charger module, and machine readable instructions stored in the one or more memory modules. The one or more memory modules are communicatively coupled to the one or more processors. The display is communicatively coupled to the one or more processors. The wireless charger module is communicatively coupled to the one or more processors, communicatively coupled to the display, and electrically coupled to an electrical system of the vehicle. When executed by the one or more processors, the machine readable instructions cause the vehicle to present a wireless charger module input control on the display, detect tactile input indicative of a selection of the wireless charger module input control, and control the wireless charger module, in response to detecting the tactile input, thereby wirelessly charging the portable electronic device.

In another embodiment, a vehicle for presenting wireless charging information includes one or more processors, one or more memory modules, a display, a wireless charger module, and machine readable instructions stored in the one or more memory modules. The one or more memory modules are communicatively coupled to the one or more processors. The display is communicatively coupled to the one or more processors. The wireless charger module is communicatively coupled to the one or more processors, communicatively coupled to the display, and electrically coupled to an electrical system of the vehicle. When executed by the one or more processors, the machine readable instructions cause the vehicle to monitor at least one parameter of the wireless charger module, determine wireless charging information based on the at least one parameter, and present the wireless charging information on the display.

In yet another embodiment, a vehicle system for wirelessly charging a portable electronic device includes one or more processors, one or more memory modules, a touchscreen display, a wireless charger module, and machine readable instructions stored in the one or more memory modules. The one or more memory modules are communicatively coupled to the one or more processors. The touchscreen display is communicatively coupled to the one or more processors. The wireless charger module is communicatively coupled to the one or more processors, communicatively coupled to the touchscreen display, and electrically coupled to an electrical system of the vehicle. When executed by the one or more processors, the machine readable instructions cause the vehicle system to present a wireless charger module input control on the touchscreen display, detect tactile input indicative of a selection of the wireless charger module input control, and control the wireless charger module in response to detecting the tactile input, thereby wirelessly charging the portable electronic device.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include vehicles and vehicle systems for wirelessly charging portable electronic devices. Referring generally to the figures, a vehicle for wirelessly charging portable electronic devices may include a processor, a memory module, a display, and a wireless charger module electrically coupled to an electrical system of the vehicle. The machine readable instructions may cause the vehicle to present a wireless charger module input control on the display, detect tactile input indicative of a selection of the wireless charger module input control, and control the wireless charger module, in response to detecting the tactile input, thereby wirelessly charging the portable electronic device. Alternatively, or additionally, the machine readable instructions may cause the vehicle to monitor at least one parameter of the wireless charger module, determine wireless charging information based on the at least one parameter, and present the wireless charging information on the display. The various vehicles and vehicle systems for wirelessly charging portable electronic devices will be described in more detail herein with specific reference to the corresponding drawings.

Figure 1:
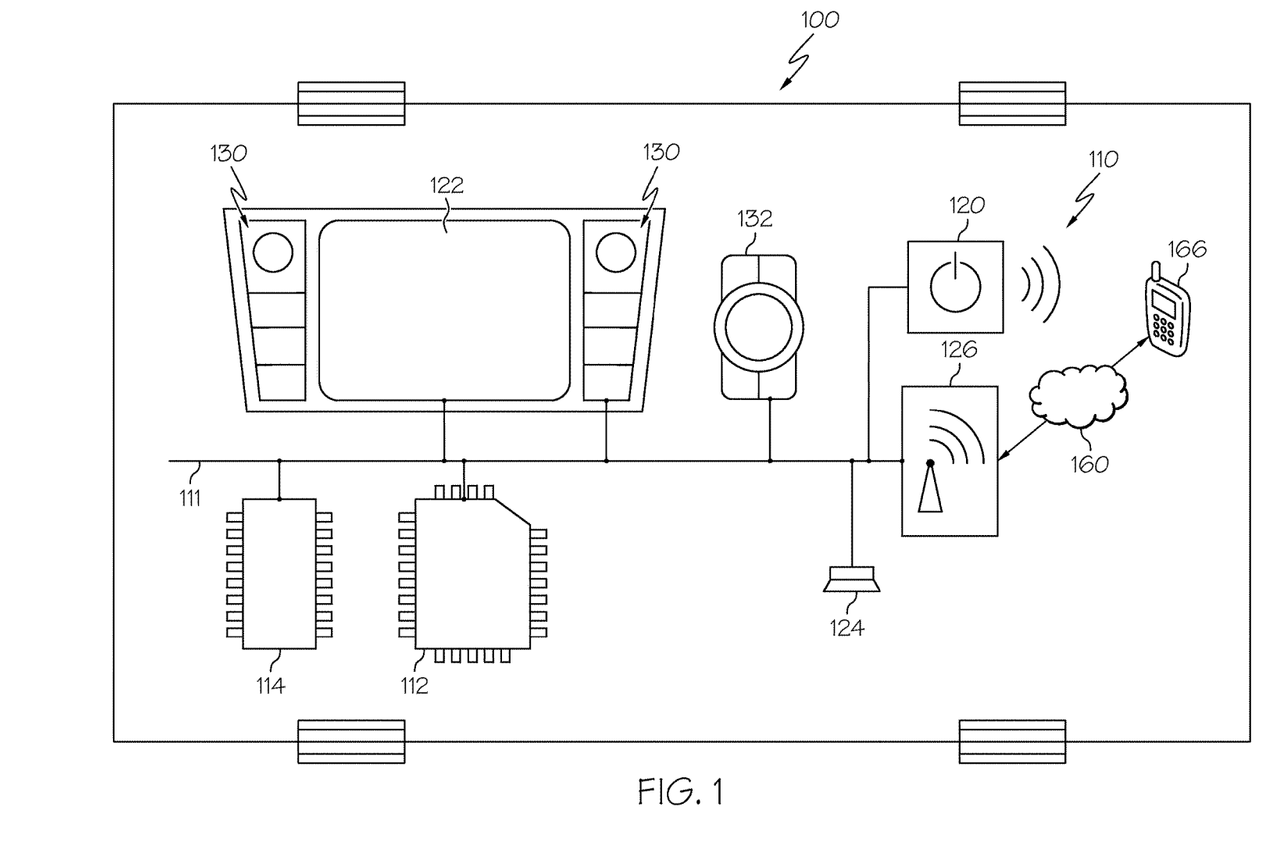
FIG. 1 schematically depicts a vehicle including a system for wirelessly charging portable electronic devices, according to one or more embodiments shown and described herein.

Referring now to FIG. 1, one embodiment of a vehicle 100 is schematically depicted. The vehicle 100 may be an automobile or any other passenger or non-passenger vehicle such as, for example, a terrestrial vehicle, an aquatic vehicle, an airborne vehicle, a tractor or a tractor truck. The vehicle 100 includes a system 110 for wirelessly charging a portable electronic device 166, as will be described in detail below. The system 110 includes a communication path 111, one or more processors 112, one or more memory modules 114, a wireless charger module 120, a display 122, a speaker 124, network interface hardware 126, tactile input hardware 130, and a peripheral tactile input 132. The various components of the system 110 and the interaction thereof will be described in detail below.

Still referring to FIG. 1, the communication path 111 may be formed from any medium that is capable of transmitting a signal such as, for example, conductive wires, conductive traces, optical waveguides, or the like. Moreover, the communication path 111 may be formed from a combination of mediums capable of transmitting signals. In one embodiment, the communication path 111 comprises a combination of conductive traces, conductive wires, connectors, and buses that cooperate to permit the transmission of electrical data signals to components such as processors, memories, sensors, input devices, output devices, and communication devices. Accordingly, the communication path 111 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 111 communicatively couples the various components of the system 110. As used herein, the term "communicatively coupled" means that coupled components are capable of exchanging data signals with one another such as, for example, electrical signals via conductive medium, electromagnetic signals via air, optical signals via optical waveguides, and the like.

Still referring to FIG. 1, each of the one or more processors 112 of the system 110 may be any device capable of executing machine readable instructions. Accordingly, each of the one or more processors 112 may be a controller, an integrated circuit, a microchip, a computer, or any other computing device. The one or more processors 112 are communicatively coupled to the other components of the system 110 by the communication path 111. Accordingly, the communication path 111 may communicatively couple any number of processors with one another, and allow the components coupled to the communication path 111 to operate in a distributed computing environment. Specifically, each of the components may operate as a node that may send and/or receive data.

Still referring to FIG. 1, each of the one or more memory modules 114 of the system 110 is coupled to the communication path 111 and communicatively coupled to the one or more processors 112. The one or more memory modules 114 may comprise RAM, ROM, flash memories, hard drives, or any device capable of storing machine readable instructions such that the machine readable instructions can be accessed and executed by the one or more processors 112. The machine readable instructions may comprise logic or algorithm(s) written in any programming language of any generation (e.g., 1 GL, 2 GL, 3 GL, 4 GL, or 5 GL) such as, for example, machine language that may be directly executed by the processor, or assembly language, object-oriented programming (OOP), scripting languages, microcode, etc., that may be compiled or assembled into machine readable instructions and stored on the one or more memory modules 114. Alternatively, the machine readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Still referring to FIG. 1, the display 122 is coupled to the communication path 111 and communicatively coupled to the one or more processors 112. The display 122 may be any device capable of providing visual output such as, but not limited to, presenting wireless charger module input controls, presenting wireless charger module control prompts, and/or presenting wireless charging information, as will be described below. The display 122 may include any medium capable of transmitting an optical output such as, for example, a cathode ray tube, light emitting diodes, a liquid crystal display, a plasma display, or the like. In some embodiments, the display 122 may be a touchscreen that, in addition to providing optical information, detects the presence and location of a tactile input upon a surface of or adjacent to the display. Accordingly, the display 122 may receive mechanical input directly upon the optical output provided by the display. Additionally, it is noted that the display 122 can include at least one of the one or more processors 112 and the one or memory modules 114. In some embodiments in which the display 122 is a touchscreen display, the touchscreen display may be integrated within a vehicle multimedia system.

Still referring to FIG. 1, the tactile input hardware 130 is coupled to the communication path 111 and communicatively coupled to the one or more processors 112. The tactile input hardware 130 may be any device capable of transforming mechanical, optical, or electrical signals into a data signal capable of being transmitted with the communication path 111. Specifically, the tactile input hardware 130 may include any number of movable objects that each transform physical motion into a data signal that can be transmitted over the communication path 111 such as, for example, a button, a switch, a knob, a microphone or the like. In some embodiments, the display 122 and the tactile input hardware 130 are combined as a single module and operate as an audio head unit of a vehicle multimedia system. However, it is noted, that the display 122 and the tactile input hardware 130 may be separate from one another and operate as a single module by exchanging signals via the communication path 111. Some embodiments may not include the tactile input hardware 130, such as embodiments in which tactile input is received by a surface of a touchscreen display.

Still referring to FIG. 1, the peripheral tactile input 132 is coupled to the communication path 111 and communicatively coupled to the one or more processors 112. For example, in some embodiments, the peripheral tactile input 132 is located in a vehicle console to provide an additional location for receiving input. The peripheral tactile input 132 operates in a manner substantially similar to the tactile input hardware 130, i.e., the peripheral tactile input 132 includes movable objects and transforms motion of the movable objects into a data signal that may be transmitted over the communication path 111. Some embodiments may not include the peripheral tactile input 132.

Still referring to FIG. 1, the wireless charger module 120 is coupled to the communication path 111, communicatively coupled to the one or more processors 112, and communicatively coupled to the display 122. The wireless charger module is electrically coupled to an electrical system of the vehicle 100. In some embodiments the wireless charger module 120 is an inductive wireless charger module operable to charge the portable electronic device 166 by inductive wireless charging. In embodiments in which the wireless charger module 120 is an inductive wireless charger module, the inductive wireless charger module includes at least one primary coil that is electrically coupled to the electrical system of the vehicle 100. The primary coil may be energized such that electric current flows through the primary coil, creating an electromagnetic field that may induce current flow in a secondary coil of the portable electronic device 166 when the secondary coil of the portable electronic device 166 is inductively coupled to the primary coil (e.g., by placing the portable electronic device 166 in close proximity to the wireless charger module 120). The induced current flow of the secondary coil may be used to charge a battery of the portable electronic device 166 or otherwise power the portable electronic device 166. In some embodiments in which the wireless charger module 120 is an inductive wireless charger module, the wireless charger module 120 may be compliant with the Qi wireless charging protocol, the A4WP wireless charging protocol, or any other wireless charging protocol. In other embodiments, the wireless charger module 120 may be a conductive wireless charger module, a resonance wireless charger module, or a radio wireless charger module. In some embodiments, the wireless charger module 120 may be included in a console assembly of the vehicle 100 as described in U.S. patent application Ser. No. 13/718,312, entitled "MOBILE DEVICE RETENTION AND CHARGING TRAY," the entirety of which is incorporated herein by reference.

Still referring to FIG. 1, the speaker 124 is coupled to the communication path 111 and communicatively coupled to the one or more processors 112. The speaker 124 transforms data signals from the system 110 into mechanical vibrations, such as in order to provide wireless charging status information, as will be described below. However, it should be understood that in other embodiments the system 110 may not include the speaker 124, such as in embodiments in which the system 110 does not provide an audible indication pertaining to wireless charging system control.

Still referring to FIG. 1, network interface hardware 126 is coupled to the communication path 111 and communicatively coupled to the one or more processors 112. The network interface hardware 126 may be any device capable of transmitting and/or receiving data via a network 160. Accordingly, network interface hardware 126 can include a communication transceiver for sending and/or receiving any wired or wireless communication. For example, the network interface hardware 126 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 126 includes hardware configured to operate in accordance with the Bluetooth wireless communication protocol. In another embodiment, network interface hardware 126 may include a Bluetooth send/receive module for sending and receiving Bluetooth communications to/from a portable electronic device 166.

Still referring to FIG. 1, in some embodiments, the system 110 may be communicatively coupled to a portable electronic device 166 via the network 160. In some embodiments, the network 160 is a personal area network that utilizes Bluetooth technology to communicatively couple the system 110 and the portable electronic device 166. In other embodiments, the network 160 may include one or more computer networks (e.g., a personal area network, a local area network, or a wide area network), cellular networks, satellite networks and/or a global positioning system and combinations thereof. Accordingly, the system 110 can be communicatively coupled to the network 160 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 1, as stated above, the network 160 may be utilized to communicatively couple the system 110 with the portable electronic device 166. The portable electronic device 166 may include a mobile phone, a smartphone, a personal digital assistant, a camera, a dedicated mobile media player, a mobile personal computer, a laptop computer, and/or any other portable electronic device 166 capable of being communicatively coupled with the system 110. The portable electronic device 166 may include one or more processors and one or more memories. The one or more processors can execute logic to communicate with the system 110. The portable electronic device 166 may be configured with wired and/or wireless communication functionality for communicating with the system 110. In some embodiments, the portable electronic device 166 may perform one or more elements of the functionality described herein, such as in embodiments in which the functionality described herein is distributed between the system 110 and the portable electronic device 166.

Figure 2:
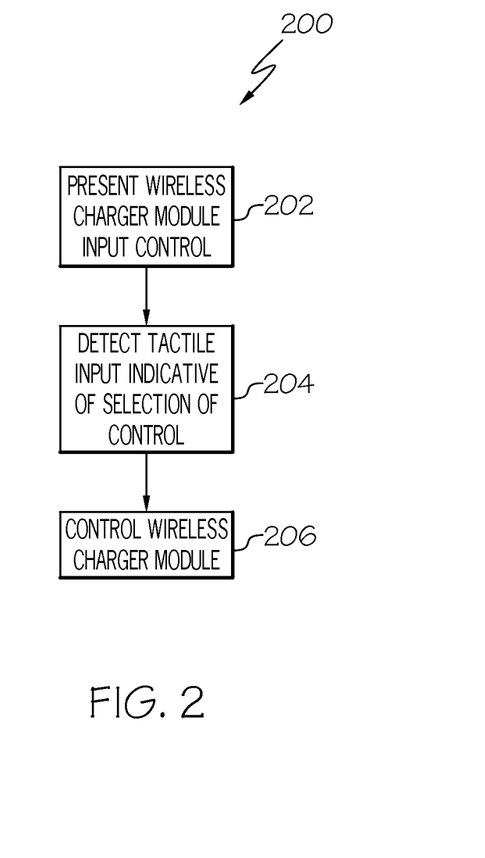
FIG. 2 schematically depicts a flowchart of a method for controlling a wireless charger module, according to one or more embodiments shown and described herein.

FIG. 2 schematically depicts a flowchart of a method 200 for controlling a wireless charger module, such as the wireless charger module 120 of FIG. 1. Referring to FIGS. 2 and 1, at block 202, the machine readable instructions stored in the one or more memory modules 114, when executed by the one or more processors 112, cause the system 110 to present a wireless charger module input control on a display. For example, referring now to FIG. 3, a graphical user interface 300 including a plurality of wireless charger module input controls that may be presented on the display 122 is schematically depicted. The wireless charger module input controls of the graphical user interface 300 include an activation input control 302, a timer set input control 304, and a charging rules input control 306. The graphical user interface 300 also includes additional controls and information, which will be described after the wireless charger module input controls are described.

Figure 3:
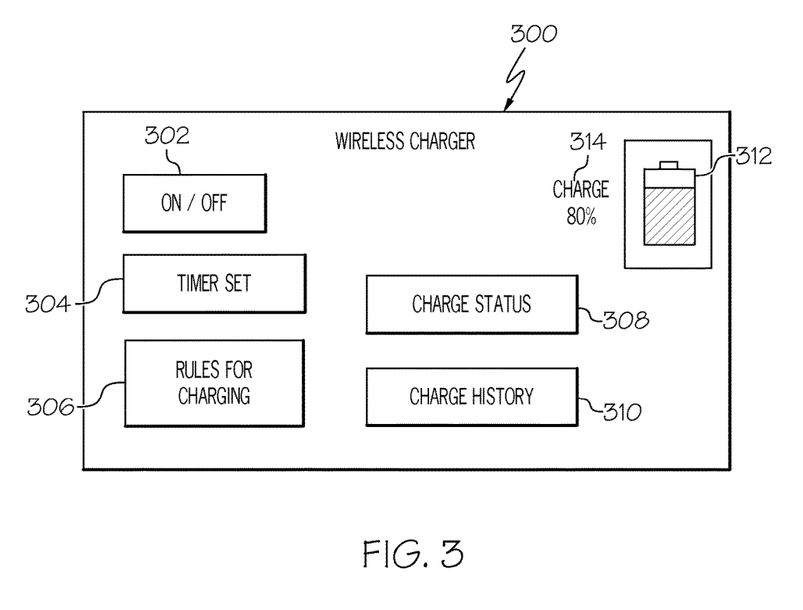
FIG. 3 schematically depicts a graphical user interface for presenting wireless charger module input controls, presenting wireless charger module control prompts, and presenting wireless charging information, according to one or more embodiments shown and described herein.

Still referring to the three wireless charger module input controls of the graphical user interface 300 depicted in FIG. 3, the activation input control 302 is operable to activate or deactivate (e.g., turn on or off) the wireless charger module 120 upon selection of the activation input control 302, as will be described below. The timer set input control 304 is operable to allow a user to set timer parameters for wireless charging of the portable electronic device 166 by the wireless charger module 120 upon selection of the timer set input control 304, as will be described below. The charging rules input control 306 is operable to allow a user to set one or more rules for charging the portable electronic device 166 by the wireless charger module 120 upon selection of the charging rules input control 306, as will be described below. While the graphical user interface 300 depicted in FIG. 3 includes the activation input control 302, the timer set input control 304, and the charging rules input control 306, some embodiments may not include one more of these controls and some embodiments may include other wireless charger module input controls operable to control the wireless charger module 120.

Referring once again to FIGS. 2 and 1, at block 204, the machine readable instructions stored in the one or more memory modules 114, when executed by the one or more processors 112, cause the system 110 to detect tactile input indicative of a selection of the wireless charger module input control. In some embodiments, a user may provide mechanical input to (e.g., by pressing) the tactile input hardware 130 in a manner indicative of a selection of one of the displayed wireless charger module input controls. In such embodiments, the system 110 may detect the tactile input associated with the user's mechanical input to the tactile input hardware 130. In some embodiments in which the display 122 is a touchscreen, a user may provide mechanical input to (e.g., by pressing) a region of the touchscreen indicative of a selection of one of the displayed wireless charger module input controls. In such embodiments, the system 110 may detect the tactile input associated with the user's mechanical input to the region of the touchscreen associated with the selected wireless charger module input control. In some embodiments, a user may provide mechanical input to (e.g., by pressing) the peripheral tactile input 132 in a manner indicative of a selection of one of the displayed wireless charger module input controls. In such embodiments, the system 110 may detect the tactile input associated with the user's mechanical input to the peripheral tactile input 132.

Still referring to FIGS. 2 and 1, at block 206, the machine readable instructions stored in the one or more memory modules 114, when executed by the one or more processors 112, cause the system 110 to control the wireless charger module 120, in response to detecting the tactile input at block 204, thereby wirelessly charging the portable electronic device 166. For example, in response to detecting tactile input indicative of a selection of the activation input control 302 at block 204, the system 110 may activate the wireless charger module 120 if the wireless charger module 120 is in a deactivated state, or may deactivate the wireless charger module 120 if the wireless charger module is in an activated state. In some embodiments in which the wireless charger module 120 is an inductive wireless charger module including a primary coil, the wireless charger module 120 may be activated by energizing the primary coil such that electric current from the electrical system of the vehicle 100 flows through the primary coil. The electric current flowing through the primary coil creates an electromagnetic field that may induce current flow in a secondary coil of the portable electronic device 166 when the secondary coil of the portable electronic device 166 is inductively coupled to the primary coil (e.g., by placing the portable electronic device 166 in close proximity to the wireless charger module 120). The induced current flow of the secondary coil may be used to charge a battery of the portable electronic device 166 or otherwise power the portable electronic device 166. In some embodiments in which the wireless charger module 120 is an inductive wireless charger module including a primary coil, the wireless charger module 120 may be deactivated by not actively energizing the primary coil, such that the portable electronic device 166 is not wirelessly charged through inductive coupling with the primary coil.

Still referring to FIG. 1 and block 206 of FIG. 2, in response to detecting tactile input indicative of a selection of the timer set input control 304 at block 204, the system 110 may allow a user to set timer parameters for wireless charging of the portable electronic device 166. The timer parameters may include a timer duration and a start time. In some embodiments, in response to detecting tactile input indicative of a selection of the timer set input control 304 at block 204, the system 110 may present a graphical user interface 400 (FIG. 4) that includes a timer duration prompt 404 and a start time prompt 402. In some embodiments, after presenting the timer duration prompt 404, the system 110 may receive a timer duration input indicative of a charge duration (e.g., by allowing a user to manipulate the timer duration prompt 404 of the graphical user interface 400 to indicate the desired charge duration). The system 110 may activate the wireless charger module 120 for the charge duration. For example, if the system 110 receives a timer duration input indicative of a 60 minute charge duration, the system 110 may activate the wireless charger module 120 for 60 minutes and then deactivate the wireless charger module 120 after the 60 minute charge duration has lapsed.

Figure 4:
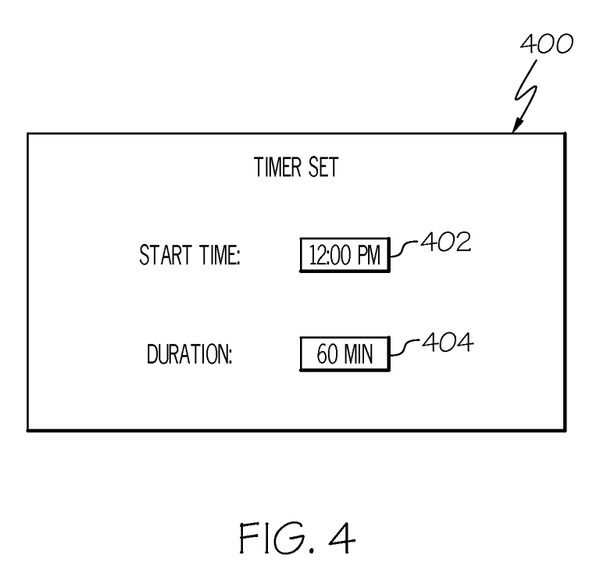
FIG. 4 schematically depicts a timer set graphical user interface, according to one or more embodiments shown and described herein.

Still referring to the setting of timer parameters, in some embodiments, after presenting the start time prompt 402, the system 110 may receive a start time input indicative of a time to activate the wireless charger module 120 (e.g., by allowing a user to manipulate the start time prompt 402 of the graphical user interface 400 to indicate the desired start time). The system 110 may activate the wireless charger module 120 at the start time. For example, if the system 110 receives start time input indicative of a 12:00 pm start time, the system 110 may activate the wireless charger module 120 at 12:00 pm. In some embodiments, the star time input and the timer duration input may be used in conjunction, such as an embodiment in which the timer is activated at a 12:00 pm start time and remains activated for a 60 minute charge duration. While the timer duration prompt 404 and the start time prompt 402 are presented on the graphical user interface 400 that is presented in response to a selection of the timer set input control 304 in some embodiments, in other embodiments, one or more of the timer duration prompt 404 and the start time prompt 402 may be included on the graphical user interface 300, such that a user is not required to separately select the timer set input control 304 in order to set the charge duration or start time.

Still referring to FIG. 1 and block 206 of FIG. 2, in response to detecting tactile input indicative of a selection of the charging rules input control 306 at block 204, the system 110 may allow a user to set one or more rules for charging the portable electronic device 166 with the wireless charger module 120. In some embodiments, in response to detecting tactile input indicative of a selection of the charging rules input control 306 at block 204, the system 110 may present a charging rule setting prompt. In some embodiments, after presenting the charging rule setting prompt, the system 110 may receive a charging rule setting input. After receiving the charging rule setting input, the system 110 may control the wireless charger module 120 in accordance with the charging rule setting input. For example, in some embodiments, the charging rule setting prompt is a charging activation threshold prompt that prompts a user for a threshold charge level of the portable electronic device 166 at which wireless charging by the wireless charger module 120 will be activated. After presenting the charging activation threshold prompt, the system 110 may receive a charging activation threshold input indicative of a threshold charge level of the portable electronic device 166 at which wireless charging of the portable electronic device 166 is to be activated. The system 110 may activate the wireless charger module 120 to wirelessly charge the portable electronic device 166 when the charge level of the portable electronic device reaches or falls below the threshold charge level. For example, the system 110 may be activated when the portable electronic device reaches or falls below a 50% charge level and may continue to wirelessly charge the portable electronic device 166 until the charge level reaches 50% or until the charge level reaches a separate charge threshold (e.g., 75% or 100%).

Referring once again to FIG. 3, the graphical user interface 300 also includes wireless charging information that may be presented on the display 122. In some embodiments, the wireless charging information may include a charge status (e.g., whether the wireless charger module 120 is activated), a charge history (e.g., a graph or description of the activation of the wireless charger module 120 or the charge level of the portable electronic device 166), or a charge level of the portable electronic device 166. The graphical user interface 300 includes a charge level icon 312 indicative of a charge level of the portable electronic device 166. The graphical user interface 300 also displays a charge percentage 314, indicative of the numeric charge percentage of the portable electronic device 166. The graphical user interface 300 includes a charge status control 308 and a charge history control 310, which may be manipulated by a user to show additional information pertaining to charge status or charge history. In other embodiments, the graphical user interface 300 may not include all of the wireless charging information displayed in FIG. 3. In some embodiments, the graphical user interface 300 may include additional wireless charging information, such as a duration that charging has taken place, whether the portable electronic device 166 is maintaining its charge, an estimated battery life for the portable electronic device 166, or the like. In some embodiments, the graphical user interface 300 may be arranged in a different manner than depicted in FIG. 3.

Figure 5:
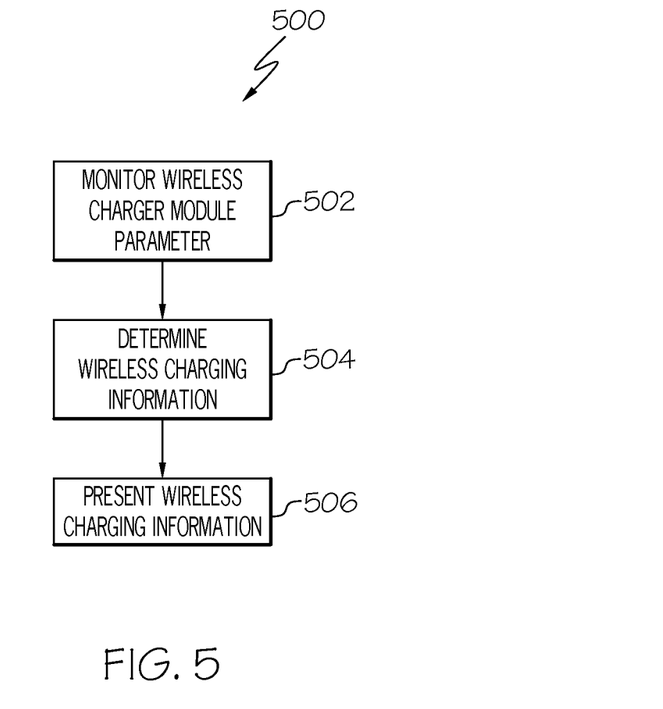
FIG. 5 schematically depicts a flowchart of a method for presenting wireless charging information, according to one or more embodiments shown and described herein.

FIG. 5 schematically depicts a flowchart of a method 500 for presenting wireless charging information. Referring to FIGS. 5 and 1, at block 502, the machine readable instructions stored in the one or more memory modules 114, when executed by the one or more processors 112, cause the system 110 to monitor at least one parameter of the wireless charger module 120. The parameter may include an activation status (i.e., whether the wireless charger module 120 is activated), a power consumption level (i.e., the amount of power currently being consumed by the wireless charger module 120), or an activation duration (i.e., how long the wireless charger module 120 has been charging the portable electronic device 166). In some embodiments, the activation status may be determined as active when the wireless charger module 120 is energized and the activation status may be determined as inactive when the wireless charger module 120 is not energized. In some embodiments, the power consumption level may be determined based on an amount of current being consumed by the wireless charger module 120. In some embodiments, the activation duration may be determined as a period of time during which the wireless charger module 120 has been continuously energized. In other embodiments, other parameters of the wireless charger module 120 may be monitored, such as temperature, or the like.

Still referring to FIGS. 5 and 1, at block 504, the machine readable instructions stored in the one or more memory modules 114, when executed by the one or more processors 112, cause the system 110 to determine wireless charging information based on the parameter monitored at block 502. In some embodiments, the wireless charging information is the activation status of the wireless charger module 120, which may be determined from an amount of power being consumed by the wireless charger module 120 at block 502. In some embodiments, the wireless charging information may include a charge history, which may be determined based on power consumption of the wireless charger module 120 over time.

In some embodiments, the machine readable instructions stored in the one or more memory modules 114, when executed by the one or more processors 112, cause the system 110 to receive charge information from the portable electronic device 166. For example, the portable electronic device 166 may transmit information to the network interface hardware 126 of the system 110 via the network 160. The transmitted information may include information pertaining to the battery level of the portable electronic device 166, the current power consumption of the portable electronic device 166, the charge rate of the portable electronic device 166, the estimated time to complete charging the portable electronic device 166, or the like. In some embodiments, the wireless charging information determined at block 504 may include an estimated charge completion time, which may be determined based on the charge information received from the portable electronic device 166, or based on both the monitored parameters of the wireless charger module 120 and the charge information received from the portable electronic device 166. For example, in some embodiments, the estimated charge completion time may be determined based on an initial charge level of the portable electronic device 166 transmitted by the portable electronic device 166 to the system 110 via the network 160 and based on the level of power consumption of the wireless charger module monitored at block 502.

Still referring to FIGS. 5 and 1, at block 506, the machine readable instructions stored in the one or more memory modules 114, when executed by the one or more processors 112, cause the system 110 to present the wireless charging information on the display 122. For example, the wireless charging information may be displayed on a graphical user interface, such as the graphical user interface 300 described above with reference to FIG. 3. For example, the charge status may be displayed in response to manipulation of the charge status control 308. The charge history may be displayed in response to manipulation of the charge history control 310. In embodiments that determine an estimated charge completion time, the estimated charge completion time may be presented on the display 122. In some embodiments, the system 110 may generate an audible output indicative of the wireless charging information through the speaker 124, such as when an audible beep is generated when the wireless charger module 120 is activated or deactivated.

It should now be understood that embodiments described herein provide vehicles and vehicle systems for wirelessly charging portable electronic devices. By controlling wireless charger modules in vehicles via a vehicle display and displaying information pertaining to wireless charging on the vehicle display, as described herein, vehicles including wireless charging modules may be simplified by eliminating the need for separate mechanical power switches and separate indicator lamps. By eliminating the need for separate mechanical power switches and separate indicator lamps, the cost and weight of vehicles including wireless charging systems may be reduced. Furthermore, controlling wireless charger modules in vehicles via a vehicle display and displaying information pertaining to wireless charging on the vehicle display, as described herein, provides for simple and intuitive interaction with a vehicle wireless charging system.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle for wirelessly charging a portable electronic device, the vehicle comprising:
   one or more processors;
   one or more memory modules communicatively coupled to the one or more processors;
   a display communicatively coupled to the one or more processors;
   a wireless charger module communicatively coupled to the one or more processors, communicatively coupled to the display, and electrically coupled to an electrical system of the vehicle, the wireless charger module being configured to charge the portable electronic device; and
   machine readable instructions stored in the one or more memory modules that cause the vehicle to perform at least the following when executed by the one or more processors:
      present a wireless charger module input control on the display;
      detect tactile input indicative of a selection of the wireless charger module input control;
      control the wireless charger module, in response to detecting the tactile input, thereby wirelessly charging the portable electronic device;
      monitor a level of power consumption of the wireless charger module; and
      determine an estimated charge completion time for the portable electronic device at least based on the level of power consumption of the wireless charger module.

2. The vehicle of claim 1, wherein the wireless charger module input control is an activation input control, and the machine readable instructions stored in the one or more memory modules, when executed by the one or more processors, cause the vehicle to control the wireless charger module by activating the wireless charger module in response to detecting tactile input indicative of the selection of the activation input control.

3. The vehicle of claim 1, wherein:
   the wireless charger module input control is a timer set input control;
   in response to detecting tactile input indicative of a selection of the timer set input control, the machine readable instructions stored in the one or more memory modules, when executed by the one or more processors, further cause the vehicle to:
      present a timer duration prompt; and
      receive a timer duration input indicative of a charge duration; and
   the machine readable instructions stored in the one or more memory modules, when executed by the one or more processors, cause the vehicle to control the wireless charger module by activating the wireless charger module for the charge duration.

4. The vehicle of claim 1, wherein:
   the wireless charger module input control is a timer set input control;
   in response to detecting tactile input indicative of a selection of the timer set input control, the machine readable instructions stored in the one or more memory modules, when executed by the one or more processors, further cause the vehicle to:
      present a start time prompt; and
      receive a start time input indicative of a time to activate the wireless charger module; and
   the machine readable instructions stored in the one or more memory modules, when executed by the one or more processors, cause the vehicle to control the wireless charger module by activating the wireless charger module at the start time.

5. The vehicle of claim 1, wherein:
   the wireless charger module input control is a charging rules input control;
   in response to detecting tactile input indicative of a selection of the charging rules input control, the machine readable instructions stored in the one or more memory modules, when executed by the one or more processors, further cause the vehicle to:
      present a charging rule setting prompt; and
      receive a charging rule setting input; and
   the machine readable instructions stored in the one or more memory modules, when executed by the one or more processors, cause the vehicle to control the wireless charger module in accordance with the charging rule setting input.

6. The vehicle of claim 5, wherein:
   the charging rule setting prompt is a charging activation threshold prompt;
   the charging rule setting input is a charging activation threshold input indicative of a threshold charge level of the portable electronic device at which wireless charging of the portable electronic device is to be activated; and the machine readable instructions stored in the one or more memory modules, when executed by the one or more processors, cause the vehicle to activate the wireless charger module when a charge level of the portable electronic device reaches or falls below the threshold charge level.

7. The vehicle of claim 1, wherein the machine readable instructions stored in the one or more memory modules, when executed by the one or more processors, cause the vehicle to present wireless charging information on the display.

8. The vehicle of claim 7, wherein the wireless charging information includes at least one of a charge status, a charge history, and a charge level.

9. The vehicle of claim 7, wherein the wireless charging information includes a charge level icon indicative of a charge level of the portable electronic device.

10. The vehicle of claim 1, wherein the display is a touchscreen integrated within a vehicle multimedia system, and the detected tactile input is indicative of tactile input on a surface of the touchscreen.

11. The vehicle of claim 1, wherein the wireless charger module includes a primary coil electrically coupled to the electrical system of the vehicle, and the machine readable instructions stored in the one or more memory modules, when executed by the one or more processors, cause the vehicle to control the wireless charger module by energizing the primary coil.

12. A vehicle for presenting wireless charging information, the vehicle comprising:
   one or more processors;
   one or more memory modules communicatively coupled to the one or more processors;
   a display communicatively coupled to the one or more processors;
   a wireless charger module communicatively coupled to the one or more processors, communicatively coupled to the display, and electrically coupled to an electrical system of the vehicle, the wireless charger module being configured to charge a portable electronic device; and
   machine readable instructions stored in the one or more memory modules that cause the vehicle to perform at least the following when executed by the one or more processors:
      monitor a level of power consumption of the wireless charger module;
      determine wireless charging information at least based on the level of power consumption of the wireless charger module; and
      present the wireless charging information on the display.

13. The vehicle of claim 12, wherein the at least one parameter of the wireless charger module includes at least one of an activation status, a power consumption level, and an activation duration.

14. The vehicle of claim 12, wherein the machine readable instructions stored in the one or more memory modules, when executed by the one or more processors, further cause the vehicle to determine an estimated charge completion time based on the level of power consumption of the wireless charger module.

15. The vehicle of claim 14, wherein the machine readable instructions stored in the one or more memory modules, when executed by the one or more processors, further cause the vehicle to present the estimated charge completion time on the display.

16. The vehicle of claim 12, wherein the machine readable instructions stored in the one or more memory modules, when executed by the one or more processors, further cause the vehicle to
   receive charge information from a portable electronic device; and
   determine the wireless charging information based on the received charge information.

17. The vehicle of claim 12, wherein the machine readable instructions stored in the one or more memory modules, when executed by the one or more processors, further cause the vehicle to perform at least the following when executed by the one or more processors:
   present a wireless charger module input control on the display;
   detect tactile input indicative of a selection of the wireless charger module input control; and
   control the wireless charger module in response to detecting the tactile input.

18. A vehicle system for wirelessly charging a portable electronic device, the vehicle system comprising:
   one or more processors;
   one or more memory modules communicatively coupled to the one or more processors;
   a touchscreen display communicatively coupled to the one or more processors;
   a wireless charger module communicatively coupled to the one or more processors, communicatively coupled to the touchscreen display, and electrically coupled to an electrical system of the vehicle, the wireless charger module being configured to charge the portable electronic device; and
   machine readable instructions stored in the one or more memory modules that cause the vehicle system to perform at least the following when executed by the one or more processors:
      present a wireless charger module input control on the touchscreen display;
      detect tactile input indicative of a selection of the wireless charger module input control;
      control the wireless charger module in response to detecting the tactile input, thereby wirelessly charging the portable electronic device;
      monitor a level of power consumption of the wireless charger module; and
      determine an estimated charge completion time for the portable electronic device at least based on the level of power consumption of the wireless charger module.

19. The vehicle system of claim 18, wherein the machine readable instructions stored in the one or more memory modules, when executed by the one or more processors further cause the vehicle system to perform at least the following:
   monitor at least one parameter of the wireless charger module;
   determine wireless charging information based on the at least one parameter; and
   present the wireless charging information on the touchscreen display.

* * * * *